United States Patent
Li et al.

(10) Patent No.: US 10,306,640 B2
(45) Date of Patent: May 28, 2019

(54) BASIC BANDWIDTH DEVICE ON SECONDARY CHANNEL

(71) Applicant: Apple Inc., Cupertino, CA (US)

(72) Inventors: Guoqing Li, Campbell, CA (US); Jarkko L. Kneckt, Los Gatos, CA (US); Christiaan A. Hartman, San Jose, CA (US); Yong Liu, Campbell, CA (US); Su Khiong Yong, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 12 days.

(21) Appl. No.: 15/783,784

(22) Filed: Oct. 13, 2017

(65) Prior Publication Data

US 2018/0227917 A1   Aug. 9, 2018

Related U.S. Application Data

(60) Provisional application No. 62/455,936, filed on Feb. 7, 2017.

(51) Int. Cl.
*H04W 52/02* (2009.01)
*H04W 72/04* (2009.01)
*H04W 84/12* (2009.01)

(52) U.S. Cl.
CPC ..... *H04W 72/0453* (2013.01); *H04W 72/042* (2013.01); *H04W 72/0413* (2013.01);
(Continued)

(58) Field of Classification Search
CPC ............. H04W 84/12; H04W 74/0816; H04W 72/0446; H04W 74/08; H04W 72/0453;
(Continued)

(56) References Cited

U.S. PATENT DOCUMENTS

| 9,900,865 B2 | 2/2018 | Seok | |
|---|---|---|---|
| 2013/0176980 A1* | 7/2013 | Kneckt | H04W 28/26 370/329 |

(Continued)

FOREIGN PATENT DOCUMENTS

| JP | 2015534389 A | 11/2015 |
|---|---|---|
| KR | 101594382 B1 | 2/2016 |

(Continued)

OTHER PUBLICATIONS

"Specification Framework for TGax", IEEE P802.11 Wireless LANs, Jan. 2016, 61 pgs.
European Patent Application No. 18155150.8—Extended European search report dated Jun. 20, 2018.
"Multi Channel Availability for UL-OFDMA", IEEE 802.11-15/0612r1, May 2015, 16 pages.
(Continued)

*Primary Examiner* — Kwasi Karikari
(74) *Attorney, Agent, or Firm* — Dickinson Wright RLLP

(57) ABSTRACT

A basic bandwidth wireless local area network (WLAN) device or station (STA) is assigned to a secondary channel. The basic bandwidth STA may be a 20 MHz STA. On the secondary channel, the basic bandwidth STA operates in a wideband mode recovering received data transmitted from an access point (AP) as part of a high bandwidth physical layer protocol data unit (PPDU). The STA and the AP can be members of a basic service set (BSS). The high bandwidth PPDU may be, for example, a 40 MHz, 60 MHz, or 80 MHz PPDU. Once on the secondary channel, the STA relies on the AP to perform channel sensing and scheduling activities, thus reducing power consumption at the STA and increasing the efficiency of the BSS. Several signaling formats are provided for indicating the secondary channel that the STA is assigned to or requests to move to.

20 Claims, 10 Drawing Sheets

(52) U.S. Cl.
CPC ........ *H04W 52/0216* (2013.01); *H04W 84/12* (2013.01); *Y02D 70/00* (2018.01); *Y02D 70/10* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/166* (2018.01); *Y02D 70/20* (2018.01); *Y02D 70/22* (2018.01); *Y02D 70/26* (2018.01)

(58) Field of Classification Search
CPC ............. H04W 74/0833; H04W 48/16; H04W 74/00; H04W 88/08; H04W 72/1278; H04W 72/14; H04L 5/0055; H04L 5/0007; H04L 5/0053; H04L 5/0048; H04L 27/2613; H04L 69/323; H04L 5/0023; H04L 2001/0093
See application file for complete search history.

(56) References Cited

U.S. PATENT DOCUMENTS

2016/0105836 A1\* 4/2016 Seok .................. H04W 72/042
370/331
2018/0167882 A1 6/2018 Choi et al.

FOREIGN PATENT DOCUMENTS

KR 1020160073319 A 6/2016
WO 2016163849 A1 10/2016

OTHER PUBLICATIONS

Japanese Patent Application No. 2018-020164—Office Action dated Feb. 25, 2019.
Korean Patent Application No. 10-2018-0015111—Preliminary Rejection dated Feb. 27, 2019.

\* cited by examiner

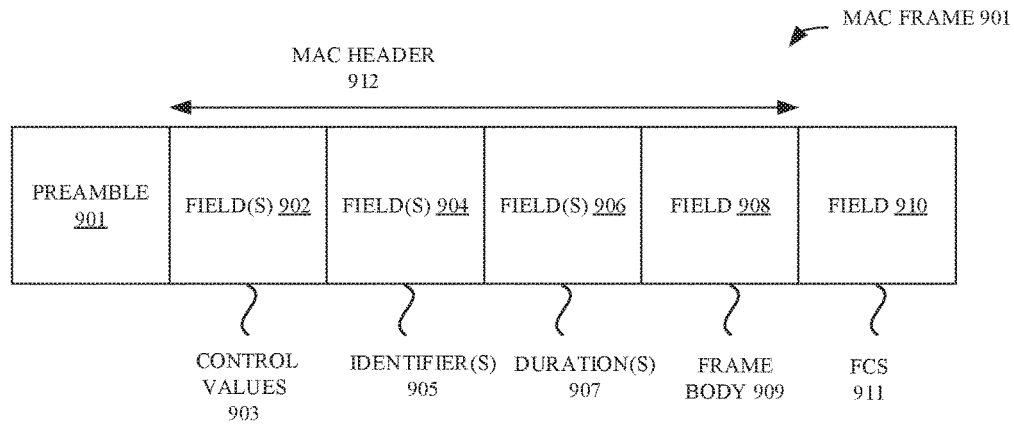
FIG. 9A
FIG. 9B
FIG. 9C
FIG. 9D
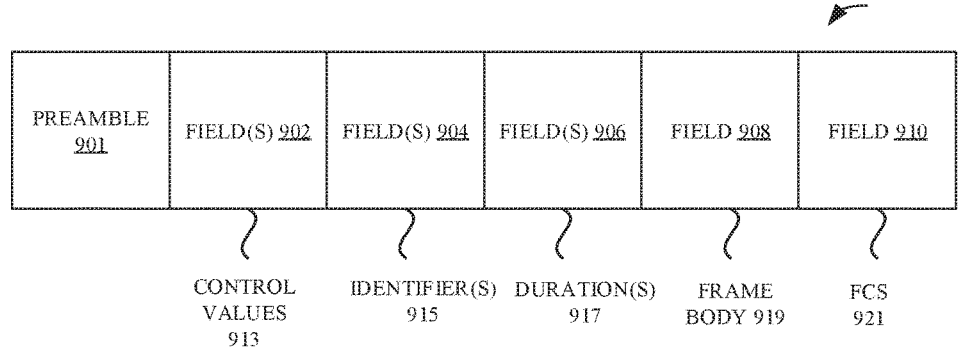
FIG. 9E

BASIC BANDWIDTH DEVICE ON SECONDARY CHANNEL

CROSS REFERENCE TO RELATED APPLICATION

This application claims benefit of U.S. Provisional Patent Application No. 62/455,936 entitled "BASIC BANDWIDTH DEVICE ON SECONDARY CHANNEL," filed Feb. 7, 2017, which is hereby incorporated by reference.

FIELD

The described embodiments relate to wireless communication, including a basic bandwidth device moving from a primary channel to a secondary channel of a shared medium, e.g., in order to make effective use of the shared medium.

BACKGROUND

A wireless local area network (WLAN) often includes an access point (AP) and one or more WLAN stations (STAs). As the AP and STAs share a common wireless medium, transmissions and collisions on the medium are common. The Institute of Electrical and Electronics Engineers (IEEE) has defined a standard for WLAN medium access control (MAC) and physical (PHY) layers. A recent version of this standard is "Part 11: Wireless LAN Medium Access Control (MAC) and Physical Layer (PHY) Specifications," IEEE Std 802.11™-2012, Mar. 29, 2012 (hereinafter "IEEE 802.11"). A STA is an addressable unit in the IEEE 802.11 standard. Some additional features proposed for IEEE 802.11 are given in "IEEE P802.11 Wireless LANS, Proposed TGax draft specification, document number IEEE 802.11-16/0024r1," Mar. 2, 2016 (hereinafter "TGAX"). Other wireless local area network standardization schemes and activities also exist. For example, the Third Generation Partnership Project (3GPP) has created a concept known as License Assisted Access (LAA) to unlicensed spectrum.

An AP is a physical or a virtual device that provides access, via a wireless medium (WM), for associated STAs to another network, such as the Internet. Devices in a WLAN communicate with each via the shared WM. STAs send, receive and/or interfere with each other on the shared WM. A STA is in-range of another STA when it can detect a transmission from the other STA directly.

SUMMARY

Representative embodiments set forth herein disclose various systems and techniques for a basic bandwidth device moving from a primary channel to a secondary channel of a shared medium, e.g., in order to make effective use of the shared medium.

In some embodiments, basic devices such as 20 MHz STAs (or STAs that operate on a single 20 MHz channel) are configured to participate in signaling so as to operate, at least some of the time, on one or more secondary 20 MHz channels. At other times, a 20 MHz STA may operate on a primary channel. 20 MHz is an example bandwidth of a basic device; generally the bandwidth of the basic STA is referred to herein as "basic bandwidth" and other devices support what is called "high bandwidth." The techniques and processes disclosed herein are equally applicable to other allocations of bandwidth. The signaling to indicate the secondary channel for the STA to use may be performed, e.g., with operation mode indication reserved bits, target wake time channel value, a control identifier in a control field inside a MAC header, or an information element in an action frame.

Some embodiments provided herein address a situation in which only one or more basic bandwidth STAs have pending traffic, while one or more high bandwidth STAs do not have pending traffic. On the downlink, during a transmission time when only basic STAs tuned to secondary channels have traffic, the AP can transmit at least a preamble on the primary channel during the transmission time. In some implementations, the preamble can be followed by, e.g., a dummy payload.

Also in some embodiments presented herein, a trigger frame need not allocate resource units (RUs) for an entire bandwidth when there is no corresponding uplink (UL) traffic demand for all of the available RUs.

This Summary is provided merely for purposes of summarizing some example embodiments so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing channel access by STAs, including use of a secondary 20 MHz channel by a STA that operates on a single 20 MHz channel. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 9A illustrates an exemplary MAC frame format, according to some embodiments.

FIG. 9B illustrates exemplary MAC frame information including an exemplary operation mode for signaling a secondary channel identifier, according to some embodiments.

FIG. 9C illustrates exemplary MAC frame information including exemplary TWT information for signaling a secondary channel identifier and a wake time, according to some embodiments.

FIG. 9D illustrates exemplary MAC frame information including an exemplary control identifier for signaling a secondary channel identifier, according to some embodiments.

FIG. 9E illustrates an exemplary action frame, a type of MAC frame, for signaling a secondary channel identifier, according to some embodiments.

DETAILED DESCRIPTION

Figure 1A:
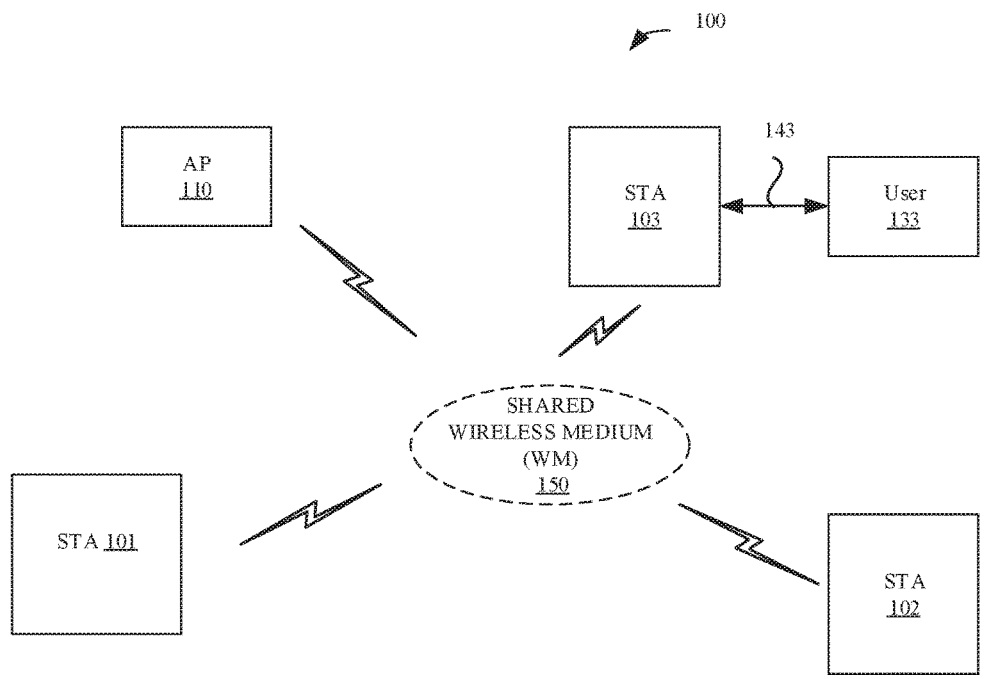
FIG. 1A illustrates an example system (basic service set, BSS) including an AP in communication over the WM with several STAs, according to some embodiments.

Obtaining and/or determining information concerning current and future use of the WM is addressed by representative embodiments set forth herein. In other words, techniques and embodiments are provided for basic devices such as 20 MHz STAs (or STAs that operate on a single 20 MHz channel) to participate in signaling so as to operate, at least some of the time, on one or more secondary 20 MHz channels. At other times, a basic device such as a 20 MHz STA may operate on a primary channel.

A network referred to as a basic service set (BSS) is the basic building block of an IEEE 802.11 WLAN. Two STAs that belong to a BSS are able to communicate directly. An AP is any entity that has STA functionality and enables access to an architectural component referred to as the distribution system (DS) in the IEEE 802.11 standard. By means of an AP, a given STA can communicate with entities outside of a coverage area of a BSS to which it belongs. The primary channel is a common channel of operation for all STAs that are members of the BSS. A beacon is a recurring time-related management frame message sent from an AP.

Furthermore, a STA can buffer data before transmission. This data is typically referred to as traffic. In general, there can be more than one kind of traffic, and therefore, there can be more than one buffer in a STA. Additionally, there may be different urgencies or delay-tolerances (which are sometimes referred to as quality of service or QoS) associated with the different buffers. Prompt establishment of channel access is needed for many traffic types.

The IEEE 802.11 standard also defines various PHY services. More than one PHY is defined within the standard. A PHY can include a physical layer convergence procedure (PLCP) layer and a physical medium dependent (PMD) function. The PMD defines methods of transmitting and receiving data through a WM between two or more STAs.

An amendment to IEEE 802.11 known as IEEE 802.11ac provides for multi-user multiple input, multiple output (MU-MIMO) techniques. In the MU-MIMO of IEEE 802.11ac, an AP or STA with more than one antenna transmits a PPDU to multiple receiving STAs over the same radio frequencies and each receiving STA simultaneously receives one or more space-time streams. IEEE 802.11ac includes primary channel bandwidths of 20 MHz, 40 MHz, and 80 MHz and a secondary 20 MHz channel. The secondary 20 MHz channel may also be referred to as a secondary channel. The primary channel and the secondary channel may be used together. Several frequency topologies are possible. IEEE 802.11ac includes definitions of high throughput (HT) PPDUs and very high throughput (VHT) PPDUs.

One PHY in IEEE 802.11 implements orthogonal frequency-division multiplexing (OFDM) using subcarriers modulated with various levels of quadrature amplitude modulation (QAM) and binary phase shift keying (BPSK). Orthogonal frequency division multiple access (OFDMA) is planned based on an amendment to IEEE 802.11. Certain aspects of OFDMA are described in the planned amendment to the IEEE 802.11 standard known as "IEEE 802.11ax." "Specification Framework for TGax, doc.: IEEE 802.11-15/0132r15," May 25, 2016 (hereinafter "IEEE 802.11ax Framework"), is a standards framework document that outlines planned topic areas for the development of IEEE 802.11ax. Several features of IEEE 802.11ax are devoted to high efficiency (HE) and so some MAC definitions in IEEE 802.11ax have a suffix of "HE." Subsequent to developing the IEEE 802.11ax Framework, the IEEE published TGAX. In TGAX, a STA may support DL and UL OFDMA. TGAX provides for 20 MHz, 40 MHz, and 80 MHz OFDMA tone plans based on resource units (RUs). Please see FIGS. 4A and 4B for illustrations of 20 MHz and 40 MHz, respectively. A tone is an OFDM subcarrier. Each RU can include, for example, 26, 52, 106, 242, 484, or 996 tones, depending on the bandwidth of the OFDMA tone plan and the number of RUs in the plan. A STA transmitting over a 20 MHz OFDMA tone plan can be referred to as transmitting over a 20 MHz channel. An AP transmitting over a first and a second 20 MHz OFDMA tone plans can be referred to as transmitting over first and second 20 MHz channels. Because OFDMA is a multiple access scheme, an AP transmitting over a 20 MHz channel can be addressing one, two, or more recipient STAs simultaneously over the 20 MHz channel using different RUs. Also, using MU-MIMO, an AP can address two or more STAs, e.g., at the same time, using a single RU.

A STA may include a station management entity (SME), a MAC layer management entity (MLME) and a physical layer management entity (PLME). Moreover, the layers and devices can communicate with each other using standardized primitives defined at service access points (SAPs). Single units of data and/or control information within a layer are called protocol data units (PDUs). For example, a PDU at the physical layer convergence procedure (PLCP) layer is referred to as a PPDU.

The MAC layer in the IEEE 802.11 standard supports a QoS facility. In particular, the QoS facility may support various priority values. A priority value is referred to as a user priority (UP). For example, a STA may inform an AP of QoS information for a given traffic flow using a QoS control field. The QoS control field may include a traffic identifier (TID) and buffer information about data corresponding to the TID. The terms "traffic identifier" and "TID" are used interchangeably herein. Information flow within a STA between layers may be via SAPs. Moreover, the units that flow across an SAP are called MAC service data units (MSDUs), and a TID is a label that distinguishes MSDUs and is used to support QoS by MAC entities. Furthermore, a TID value may specify a traffic category (TC) or a traffic stream (TS). A TC may indicate a distinct user priority (UP) among MSDUs for delivery over a given link, and a TS may be a set of MSDUs to be delivered subject to QoS parameter values provided to the MAC in a particular traffic specification (TSPEC). More details on the QoS facility of the MAC layer are provided in the IEEE 802.11 standard.

The IEEE 802.11 MAC layer provides access to the WM via a distributed coordination function (DCF). The main access mechanism of IEEE 802.11 is a DCF known as carrier sense multiple access with collision avoidance (CSMA/CA). For a STA to transmit, it senses the medium to determine if another STA is currently transmitting. When a first STA is not able to sense the presence of a second STA using CSMA/CA, the second STA is referred to as hidden with respect to the first STA. If the STA sensing the WM finds the WM to be busy, it defers attempting to transmit, e.g., until the end of the current transmission. Prior to attempting to transmit, the STA selects a random backoff interval and decrements a backoff interval counter while the WM is idle. After the backoff interval counter reaches zero, if the WM is still idle, the STA can transmit. In order to further reduce the probability of collision on the WM (for example, transmission collision with a hidden STA), short control frames known as Request to Send (RTS) and Clear to Send (CTS) can be used. These procedures of the IEEE 802.11 standard, including IEEE 802.11ac, may be referred to herein as shared WM protocol rules or as WM protocol rules.

Carrier sense can be performed both through physical and virtual techniques. The physical technique is known as clear channel assessment (CCA) and can include an energy measurement or received signal strength indicator (RSSI) measurement. The physical technique is referred to as sensing. The virtual CS mechanism, based on a state variable or value called the network allocation vector (NAV), is achieved by distributing reservation information announcing the impending use of the WM. The NAV provides a prediction of future traffic on the WM based on duration information that is announced in RTS/CTS frames prior to the actual exchange of data. The duration information is also available in the MAC header of many frames. Demodulating and recovering the data of an observed frame is referred to as receiving. The CS mechanism combines the NAV state and the STA's transmitter status with physical CS (CCA) to determine the busy/idle state of the medium. The NAV may be thought of as a counter that counts down to zero at a given rate. When the counter reaches zero or the NAV is reset, the virtual CS indication is that the channel is idle. When the counter is not zero, the CS indication is that the channel is busy.

Some TGAX frames are transmitted as non-HT (non-high throughput) Duplicate PPDUs. This means that the frames are copies of each other. Such a frame can be addressed to the same address in all channels. There are instructions per responding STA; in some embodiments, the responding STAs may only receive such a frame transmitted on their primary channel.

The MAC layer in a STA can construct MAC frames. A MAC frame may include a MAC header, a variable length frame body, and a cyclic-redundancy check field called the FCS. The MAC header may include an instance of the duration field mentioned above, and address information. The MAC header can also include QoS control information and HT control fields (where HT stands for high throughput). The QoS control information, if present, may be in a subfield known as the QoS Control field. The QoS control field can also include information related to the data buffer associated with the TID, such as a TXOP duration requested value or a queue size value. The IEEE 802.11ax Framework specifies that the IEEE 802.11ax specification will have a variation of the HT Control field, which is called the HE control field.

Enhanced distributed channel access (EDCA) is a prioritized CSMA/CA access scheme used by STAs and APs supporting QoS. A transmission opportunity (TXOP) in EDCA is defined by rules that permit access to the WM. There is typically a delay or latency between initiation of EDCA by a STA to send data and successful transmission of that data because the WM is an unscheduled, shared medium that can be prone to collisions when accessed via EDCA.

The IEEE 802.11 standard also provides a collection of features called services. Two example services that can be provided by an IEEE 802.11 WLAN are MSDU delivery and QoS traffic scheduling. QoS traffic scheduling can be contention-based or by controlled channel access. At each TXOP, an IEEE 802.11 STA may select a frame for transmission based on a requested UP and/or parameter values in a TSPEC for an MSDU.

The QoS control field can be sent by a STA to an AP to indicate buffered traffic associated with a given TID awaiting transmission. The receiving AP can use the received QoS control field to schedule controlled channel access, i.e., an uplink transmission opportunity for the STA to send a portion of the data associated with the TID indicated in the QoS control field received by the AP.

According to TGAX, resource allocation information for one or more addressed STAs can be sent by an AP in a control frame called a trigger frame. The trigger frame may convey or carry sufficient information to identify the STAs transmitting uplink (UL) multiuser (MU) PPDUs and the trigger frame may allocate resources for the addressed STAs to transmit those UL MU PPDUs at a certain time interval subsequent to the trigger frame. The transmissions from all of the STAs contributing to the UL MU PPDU may end at a time indicated in the trigger frame.

The trigger frame is used to allocate resources for UL MU transmission and to solicit UL MU transmissions subsequent to the trigger frame. An MU-RTS frame may request that a STA respond with a CTS frame. An RU allocation subfield in a per-user information field addressed to the STA may indicate whether the CTS frame is to be transmitted on the primary 20 MHz channel or on another channel. A STA addressed by an MU-RTS frame may transmit a CTS response after the end of the PPDU containing the MU-RTS frame if the MU-RTS frame has a per-user information field addressing the STA and if the medium is idle according to CS mechanisms.

An AP can poll STAs according to TGAX to determine the buffer status of the respective STAs. Based on the results of the poll, the AP can schedule resources for the STAs. A given STA can respond with a QoS data frame or with a QoS null data frame. The scheduled STAs then transmit some of the data from their buffers using the scheduled resources.

Representative applications of apparatuses, systems, and methods according to the presently described embodiments are provided in this section. These examples are being provided solely to add context and to aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible and the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices in order to provide specific communication services through a WPAN. In some situations, the wireless device can act as a communications hub that provides access through a wireless local area network ("WLAN") and/or a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection (e.g., through a companion device) can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols, such as used for communication on or over: a wireless wide area network (WWAN), a wireless metro area network (WMAN), a wireless local area network (WLAN), a wireless personal area network (WPAN), near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rates and/or greater throughput, as compared to other 3G legacy networks offering lower data rates and/or throughput. For instance, in some implementations, a multi-mode wireless device or UE may be configured to fall back to a 3G legacy network, e.g., an Evolved High Speed Packet Access (HSPA+) network, or a Code Division Multiple Access (CDMA) 2000 Evolution-Data Only (EV-DO) network, when LTE and LTE-A networks are otherwise unavailable.

System

FIG. 1A illustrates an exemplary WLAN system 100 making use of a shared wireless medium, or WM, 150. The WLAN system 100 includes an AP 110 and one or more STAs. For example, the WLAN system 100 may include STA 101, STA 102, and STA 103. STA 103 is illustrated as being in communication with a user 133. Inputs and outputs between user 133 and STA 103 are represented generically by the reference numeral 143. The AP 110 may communicate over one or more IEEE 802.11 channels, e.g., of predetermined bandwidths. Each channel may represent a number of tones or subcarriers that make up RUs as described above (also see FIGS. 4A and 4B). Over time, the AP 110 may communicate with the STAs of FIG. 1A using RUs on a given one or more channels. AP 110 may determine present and imminent use of the WM 150. On the basis of this determining, AP 110 and other STAs may make use of the shared WM.

STA 101 may be a 20 MHz STA, referred to here as a basic bandwidth STA. A basic bandwidth STA operates on a single channel, e.g., a single 20 MHz channel. STA 103 may be a 40 MHz, 60 MHz or 80 MHz STA, collectively referred to here as a high bandwidth STA. A high bandwidth STA is capable of concurrently operating on more than one channel, e.g., two or more 20 MHz channels. As one example of efficiently using the WM 150 by embodiments presented herein, STA 101 may move from a primary channel, e.g., that is congested, to a secondary channel, e.g., that is relatively less congested.

Figure 1B:
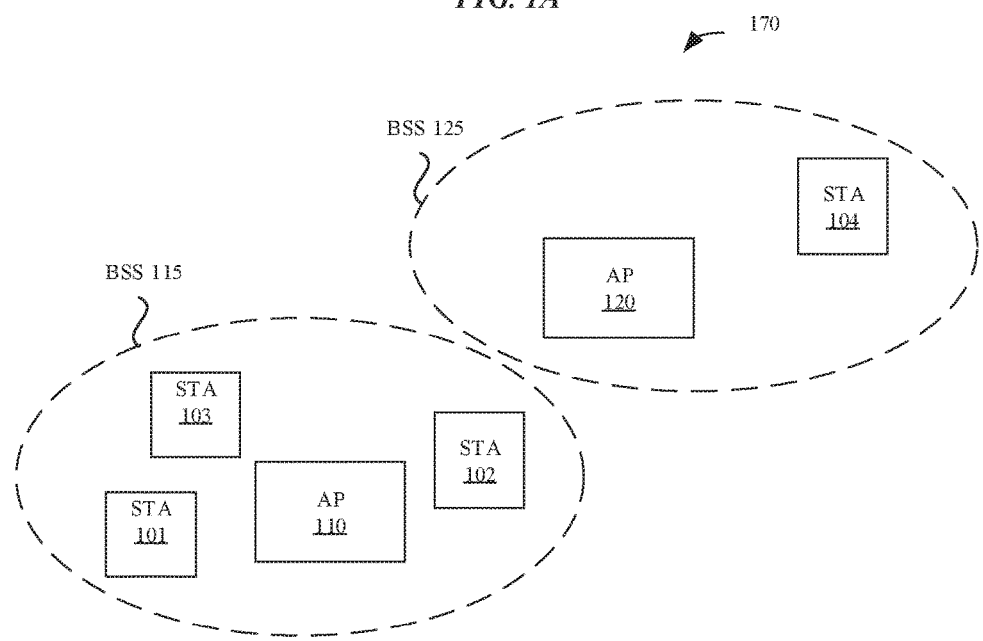
FIG. 1B illustrates the BSS of FIG. 1A and another example BSS, according to some embodiments.

FIG. 1B illustrates a BSS 115 and a BSS 125 in a region 170. BSS 115 includes the AP 110 and STAs 101, 102, and 103 of FIG. 1A. BSS 125 includes an AP 120 and a STA 104. In some instances, BSS 125 is an overlapping BSS (OBSS)

with respect to BSS 115, e.g., in that a STA (such as STA 102) can detect both AP 110 and AP 120. Unless indicated otherwise, the events, signals, timing and frequency usage discussed in this application refer to BSS 115.

Typical Signaling Resulting in Unused Bandwidth

In some typical WLAN systems, an AP transmits over a high (or wide) bandwidth channel, such as 40 MHz, 60 MHz, or 80 MHz. Some STAs are only able to transmit and receive wireless signals in a 20 MHz bandwidth (e.g., on a single channel). In some systems, those 20 MHz STAs (also referred to herein as "basic bandwidth" devices or STAs) participate in wideband OFDMA by transmitting and receiving using RUs within a 20 MHz bandwidth on a primary channel, while the rest of the 40/60/80 MHz is allocated by the AP to high bandwidth STAs. With respect to terminology, a STA capable of operating at or over 80 MHz is referred to herein as an 80 MHz STA. An example is given below in terms of STAs 101 and 102, as 20 MHz STAs, and STA 103 as a 40 MHz STA.

Figure 2:
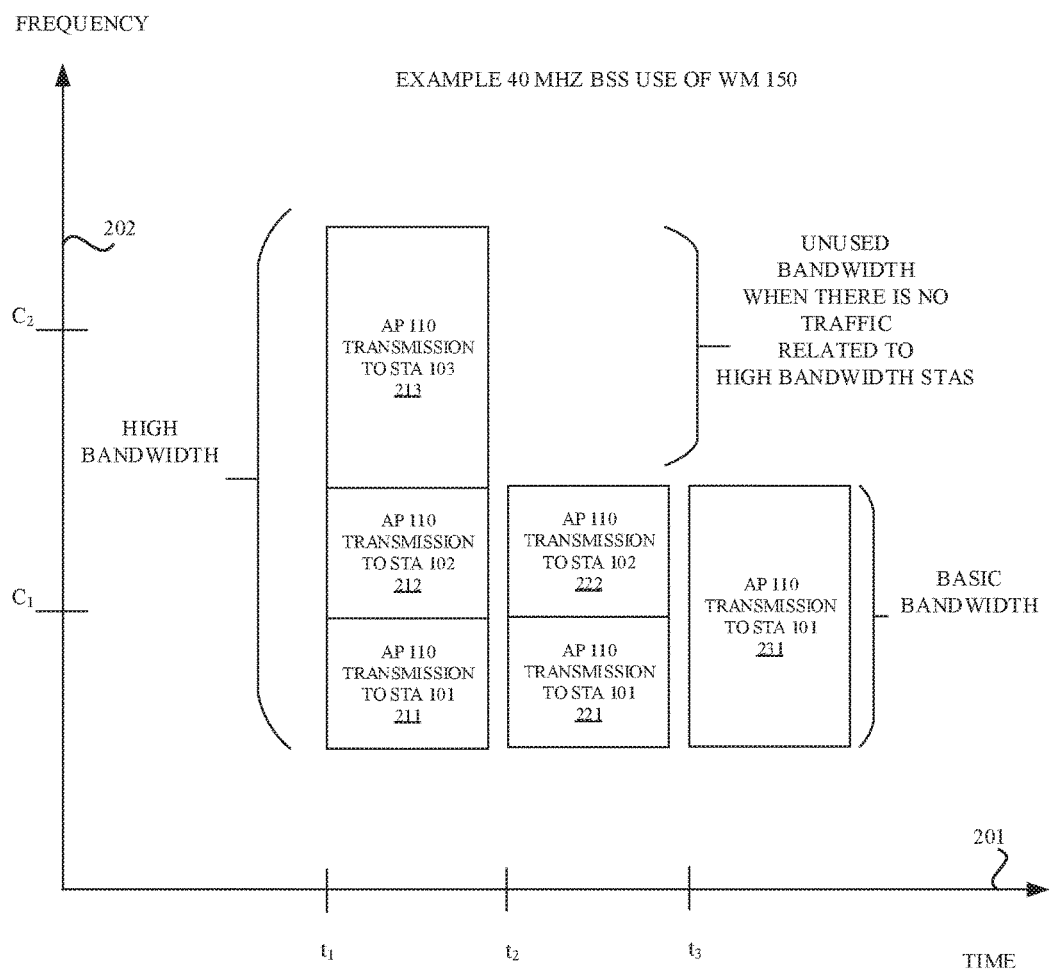
FIG. 2 illustrates exemplary transmission events over first and second channels including high bandwidth and basic bandwidth aspects, according to some embodiments.

FIG. 2 illustrates an example of usage of a channel medium involving two basic bandwidth (e.g., 20 MHz) channels, $C_1$ and $C_2$. The x-axis 201 is a time axis. The y-axis 202 is a frequency axis. In some embodiments, $C_1$ is a primary 20 MHz channel and $C_2$ is a secondary 20 MHz channel. In general, for a WLAN system bandwidth of 160 MHz, there are eight 20 MHz channels: $C_1, C_2, \ldots, C_8$ and so three bits are needed to specifically indicate any one of these 20 MHz channels. For a 20 MHz BSS, if $C_1$ is the primary channel, then $C_2, C_3, \ldots C_8$ are all secondary 20 MHz channels.

An example of a basic bandwidth STA is a 20 MHz STA. A 20 MHz STA can send and receive data using a 20 MHz tone plan (see FIG. 4A). A high bandwidth (e.g., 40 MHz) STA can send and receive over two (or more) of these channels using a 40 MHz (or higher) tone plan (see FIG. 4B). TGAX provides more details on 20 MHz, 40 MHz, and other tone plans.

Three overall epochs are shown in FIG. 2, illustrating typical use of the WM 150 in a 40 MHz BSS. During a time from $t_1$ to $t_2$, AP 110 transmits to STA 103 (transmission 213), to STA 102 (transmission 212), and to STA 101 (transmission 211). Transmissions 213, 212, and 211 taken as a whole represent a single wideband (or high bandwidth) transmission using a 40 MHz tone plan (e.g., see FIG. 4B).

At time $t_2$, STA 101 and STA 102 both have DL data pending, and there is not sufficient bandwidth to deliver all of the data in a single 20 MHz PPDU. Also at time $t_2$, STA 103 has no need of the WM 150 for DL data, nor for UL data. In a typical system, STA 101 must stay parked on the primary 20 MHz channel, in this case, $C_1$. Hence at $t_1$, transmissions 222 and 221 occur as a single 20 MHz PPDU and the bandwidth corresponding to $C_2$ is unused, as marked in FIG. 2. At $t_3$, a subsequent transmission 231 over the 20 MHz primary channel $C_1$ (marked as basic bandwidth) occurs delivering pending data to STA 101.

Figure 3:
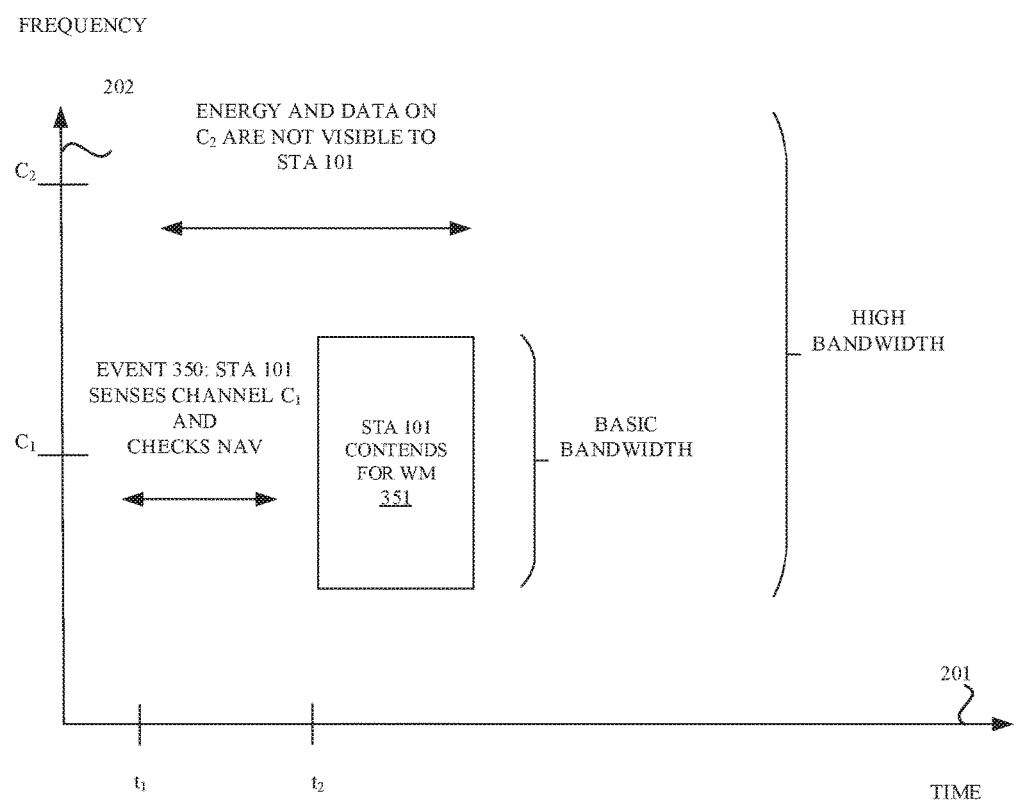
FIG. 3 illustrates an example basic bandwidth STA contending for access to the WM.
Figure 4A:
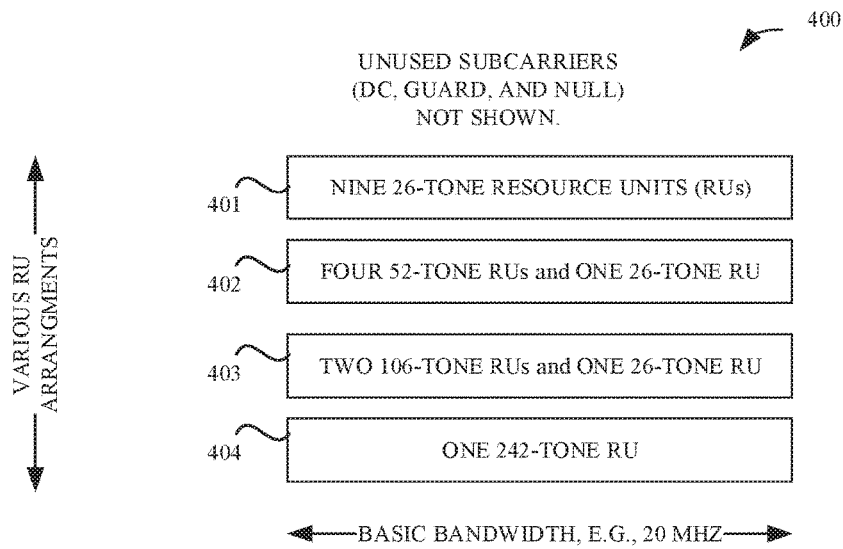
FIGS. 4A and 4B illustrate example 20 MHz and 40 MHz tone plans as illustrated in TGAX.
Figure 4B:
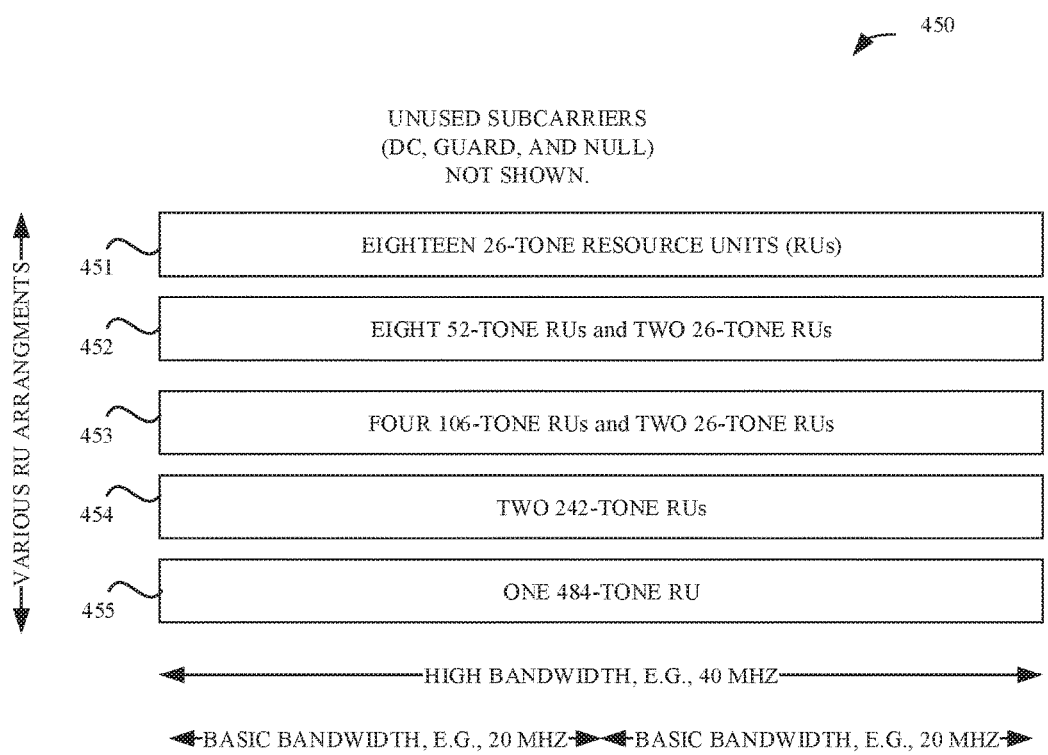

Before addressing the unused bandwidth illustrated in FIG. 2, some terminology with respect to channel access will be introduced while discussing FIG. 3, and some terminology with respect to tone plans will be introduced while discussing FIGS. 4A and 4B.

Single User (SU) Channel Contention

FIG. 3 illustrates single user EDCA operation of STA 101 when it has, for example, UL data to send. At time $t_1$, event 350 occurs in which STA 101 senses the WM 150. That is, STA 101 listens to the 20 MHz band centered at $C_1$, the primary 20 MHz channel for the BSS 115. STA 101 also checks one or more network allocation vector (NAV) values (for example, for BSS 115 and for overlapping BSS's such as 125). At $t_2$, after determining the WM 150 is free at $C_1$, the STA 101 sends uplink transmission 351. A collision of UL transmissions at time $t_2$ may or may not result with another STA. For example a collision of transmission 351 with a transmission from STA 102 may occur under certain circumstances if STA 102 was also evaluating EDCA in the time period before $t_2$. Transmission events may occur over the secondary 20 MHz channel, which is part of "high bandwidth" or of, for example, a 40 MHz channel. Those events at $C_2$ are not visible to STA 101 because it is parked on (or tuned to) the 20 MHz band ("basic bandwidth") centered at $C_1$.

Tone Plans

FIG. 4A illustrates a 20 MHz tone plan 400 provided in TGAX, which also corresponds to a 20 MHz spectral mask (not shown). FIG. 4A is referred to as an exemplary basic bandwidth subcarrier arrangement in this application. Various RU arrangements are illustrated at reference numerals 401 (nine 26-tone RUs), 402 (four 52-tone RUs and one 26-tone RU), 403 (two 106-tone RUs and one 26-tone RU) and 404 (one 242-tone RU).

FIG. 4B illustrates a 40 MHz tone plan 450 provided in TGAX, which also corresponds to a 40 MHz spectral mask (not shown). FIG. 4B is an example of a high bandwidth subcarrier arrangement. Various RU arrangements are illustrated at reference numerals 451 (eighteen 26-tone RUs), 452 (eight 52-tone RUs and two 26-tone RUs), 453 (four 106-tone RUs and two 26-tone RUs), 454 (two 242-tone RUs) and 455 (one 484-tone RU). 60 MHz and 80 MHz tone plans of TGAX are also high bandwidth subcarrier arrangements with respect to this application.

A 20 MHz STA (also referred to as a "basic bandwidth STA" herein) can demodulate a subset of RUs of a 40 MHz PPDU. That is, a 20 MHz STA can demodulate RUs of FIG. 4B falling within the leftmost 20 MHz of FIG. 4B or the rightmost 20 MHz of FIG. 4B. A 40 MHz, 60 MHz, or 80 MHz STA (also referred to as "high bandwidth STA" herein) can demodulate all of the RUs in a PPDU built up using the tone plan represented in FIG. 4B.

Logic

In some embodiments, either a STA or an AP can initiate a move or switch of the STA to a secondary channel. The move, in some embodiments, is based on signaling using any/all of an operating mode indication (OMI), a target wake time (TWT) information element (IE), a control identifier or ID in an HE control field, and/or with a 20 MHz-operating request/response frame. In some other embodiments, other signaling can be used. In some embodiments, the STA only begins communication with the AP on the requested or assigned channel after receiving (or sending, as the case may be) an acknowledgement of the request.

Figure 5:
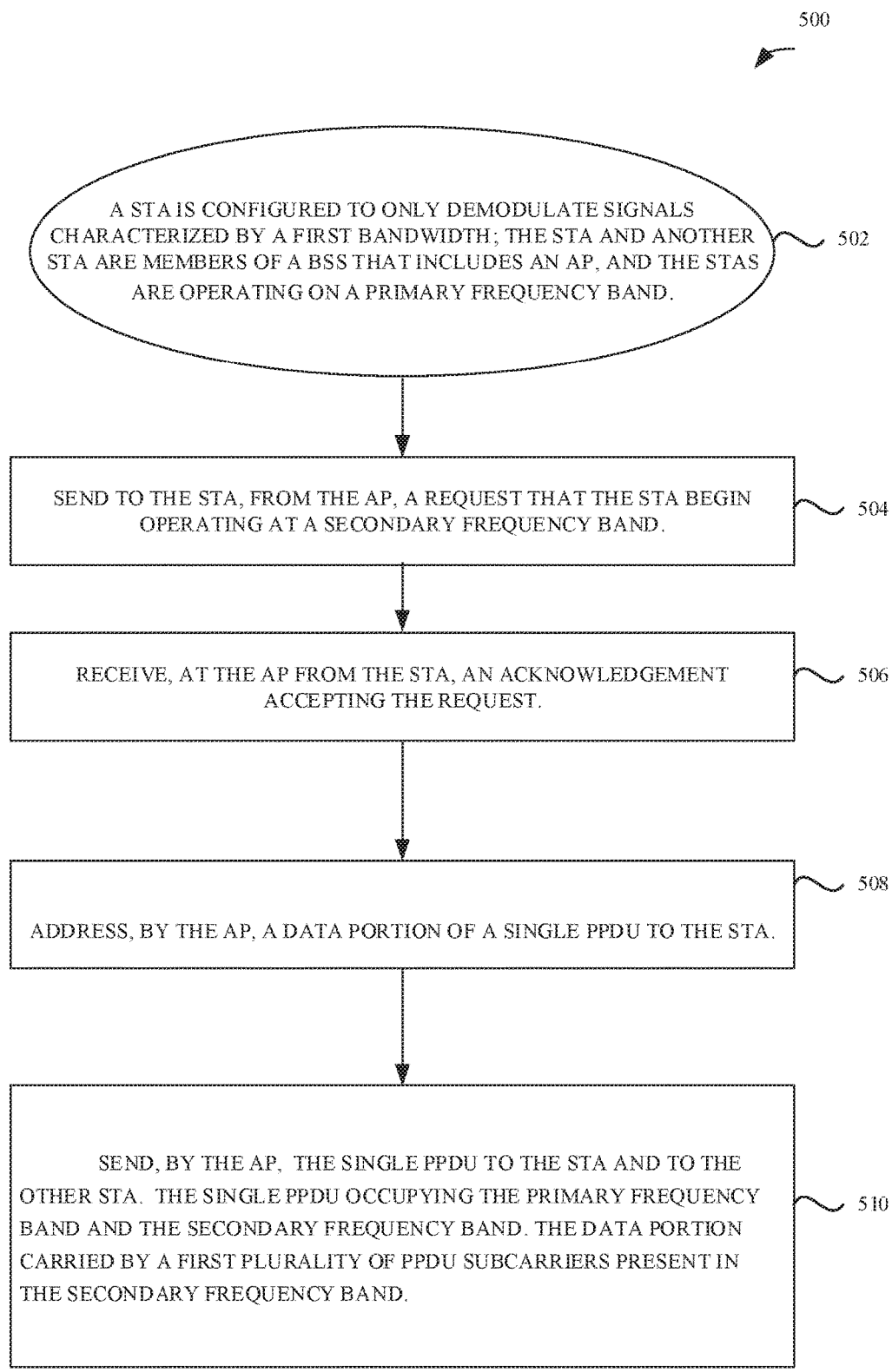
FIG. 5 illustrates exemplary logic for a basic bandwidth STA of a BSS and, in cooperation with an AP of the BSS, logic for moving from a primary channel to a secondary channel, according to some embodiments.

FIG. 5 illustrates exemplary logic 500 for making efficient use of the WM 150 with a basic bandwidth STA. Initial condition information of logic 500 is provided at 502 of FIG. 5. A STA is configured to only demodulate a signal having a first bandwidth ("basic bandwidth," e.g., 20 MHz). The STA and another STA are members of a BSS that includes an AP. The STA is operating on a primary channel (e.g., a primary 20 MHz channel).

At 504, the AP sends the STA a request. The request indicates that the AP wants the STA to move (retune) to another particular basic bandwidth channel (e.g., a secondary 20 MHz channel). The request also includes information indicating which channel to move to, for example, a three-bit index identifying the secondary channel to be used by the STA. Alternatively, an 8-bit bitmap may be used as described below. At 506, the AP receives from the STA an acknowledgement of the request. In some embodiments (not shown in FIG. 5), a STA requests the move and the AP either accepts (or approves) the move or rejects the move.

At 508, the AP addresses a data portion of a PPDU to the STA. At 510, the AP sends the PPDU to the STA and to, for example, another STA. The PPDU occupies the primary frequency band and the secondary frequency band. The data portion of the PPDU is carried by a first plurality of PPDU subcarriers present in the secondary frequency band.

Transmission From AP to Basic STA on a Secondary Channel

Figure 6:
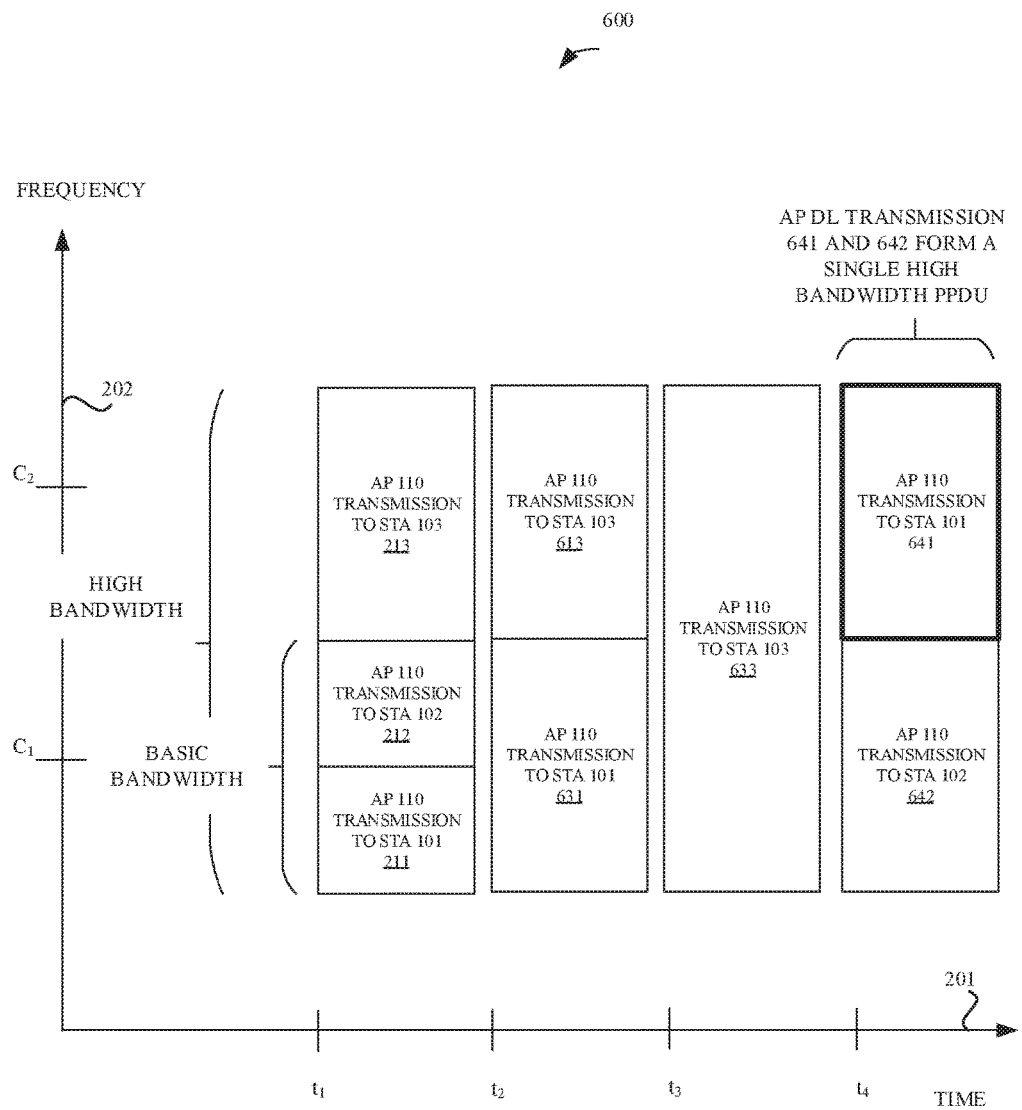
FIG. 6 illustrates exemplary downlink (DL) transmission events using the logic of FIG. 5, according to some embodiments.

FIG. 6 illustrates an exemplary signaling sequence 600 that reflects a portion of the logic of FIG. 5. At $t_1$, transmission of a single PPDU, comprising transmissions 211, 212 and 213, occurs as in FIG. 2. At $t_2$, transmission of a single PPDU including transmissions 613 and 631 occurs. At $t_3$, a high bandwidth (e.g., 40 MHz) transmission 633 to STA 103 occurs. At $t_4$, AP 110 transmits message or transmission 641 (shown with a heavy outline) to basic bandwidth STA 101 on the secondary channel $C_2$; transmission 641 is part of a single PPDU also including transmission 642 to STA 102 on the primary channel, $C_1$ (for example, a primary 20 MHz channel). Bandwidth of the WM 150 has been efficiently used by moving STA 101 to secondary channel $C_2$. Signaling aspects are not explicitly shown in FIG. 6.

A STA using a non-primary channel can only use multiuser (MU) transmission and reception, since it is blind to the status of the primary channel (in contrast to the STA on $C_1$ in FIG. 3). A STA operating on a non-primary channel relies on the AP for protection of transmissions from collisions in the shared WM 150. EDCA is still needed in response to a trigger frame. A STA may set NAV if the STA correctly receives an OBSS packet on a secondary channel. The STA can always switch back to a primary 20 MHz channel (basic bandwidth channel) if necessary to send urgent traffic (see the STA on $C_1$ in FIG. 3).

From the AP's point of view, moving one or more selected STAs to secondary channels allows the AP to do load balancing, interference management, and/or to maximize spectrum utilization.

From a STA's point of view, moving to a secondary channel can lead to battery power savings, e.g., because no energy is spent sensing the WM (contrast FIG. 3). Since more transmissions will be made on a scheduled basis, fewer collisions will occur and latency (or time delay) to deliver/receive a message will be improved. This corresponds to a network efficiency improvement.

Transmission to Basic STA on Secondary Channel

Figure 7:
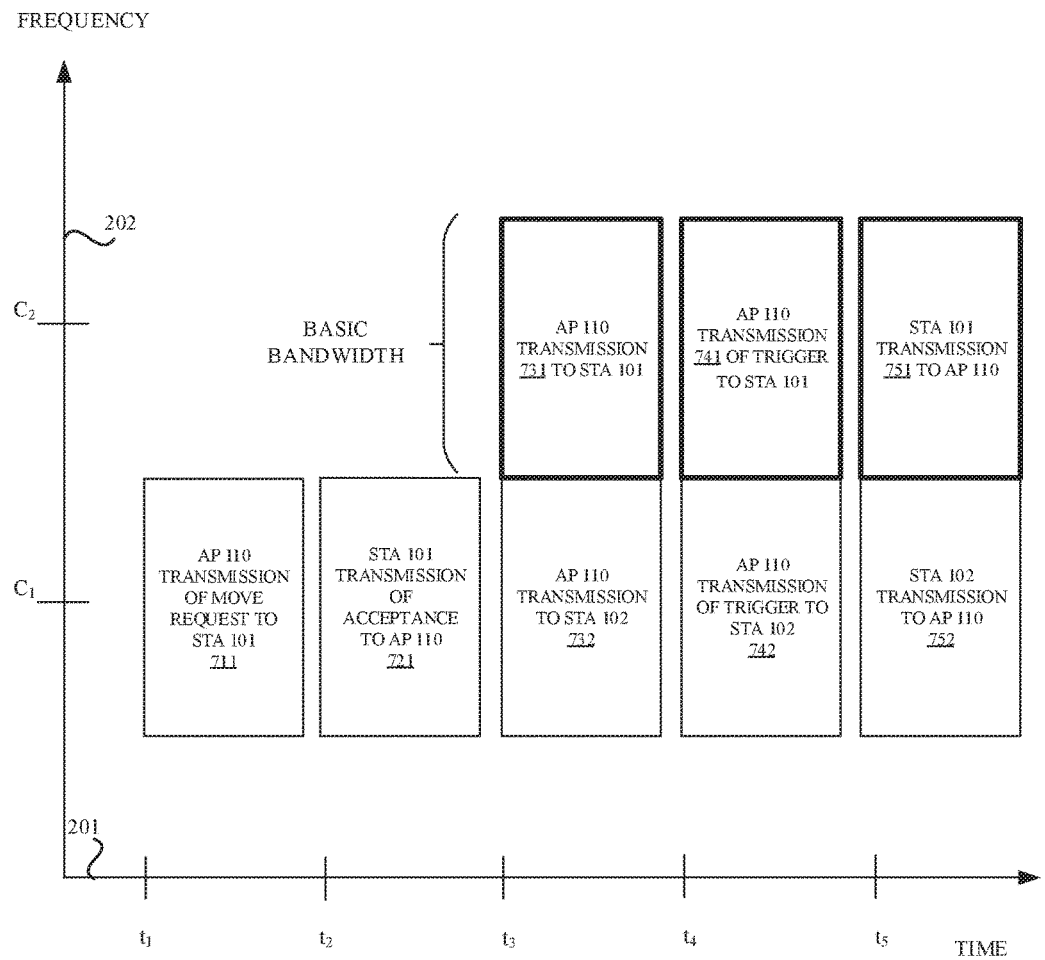
FIG. 7 illustrates exemplary DL and uplink (UL) transmission events including a basic bandwidth STA moving from a primary channel to a secondary channel, according to some embodiments.

FIG. 7 provides exemplary details supporting a transmission, such as the FIG. 6 transmission 641 on a secondary channel, such as $C_2$, for example, a secondary 20 MHz channel. At $t_1$, AP 110 uses a message 711 over the primary channel $C_1$ to ask (or direct) STA 101 to retune (move) to a secondary channel and AP 110 provides a channel identifier. For example, the identifier may indicate channel $C_2$. At $t_2$, STA 101 transmits acceptance 721 of the move (an acknowledgement) to AP 110. At $t_3$, AP 110 transmits a single high bandwidth PPDU (e.g., a 40 MHz PPDU) including subcarriers supporting transmission 731 and 732. The transmission 731 is within a basic bandwidth associated with channel $C_2$. At $t_4$, AP 110 sends a trigger 741 to STA 101 on $C_2$. This trigger message is also indicated as 742 with respect to STA 102 on $C_1$. The triggers 741 and 742 occupy a single PPDU and may be referred to as a single (wideband) trigger message. At $t_5$, STA 101 responds to the trigger PPDU with UL data in a message 751 and STA 102 responds to the trigger PPDU with UL data in a message 752.

Transmissions 731, 741, and 751, enabled by this disclosure, are emphasized with heavy box outlines in FIG. 7.

For a STA to receive a trigger on a secondary channel (for example trigger 741), the trigger, in some embodiments, is implemented using a non-HT duplicate PPDU format. The receiving STA can then decode this PPDU and recognize the trigger event. In some embodiments, when AP 110 allocates RUs to STAs in a trigger frame, AP 110 does not need to assign all RUs if there is inadequate traffic demand to load all of the available RUs.

Channel information can be signaled in several ways. Further discussion of signaling the channel information is provided below with respect to FIGS. 9A-9E.

Target Wake Time on Secondary Channel

Figure 8:
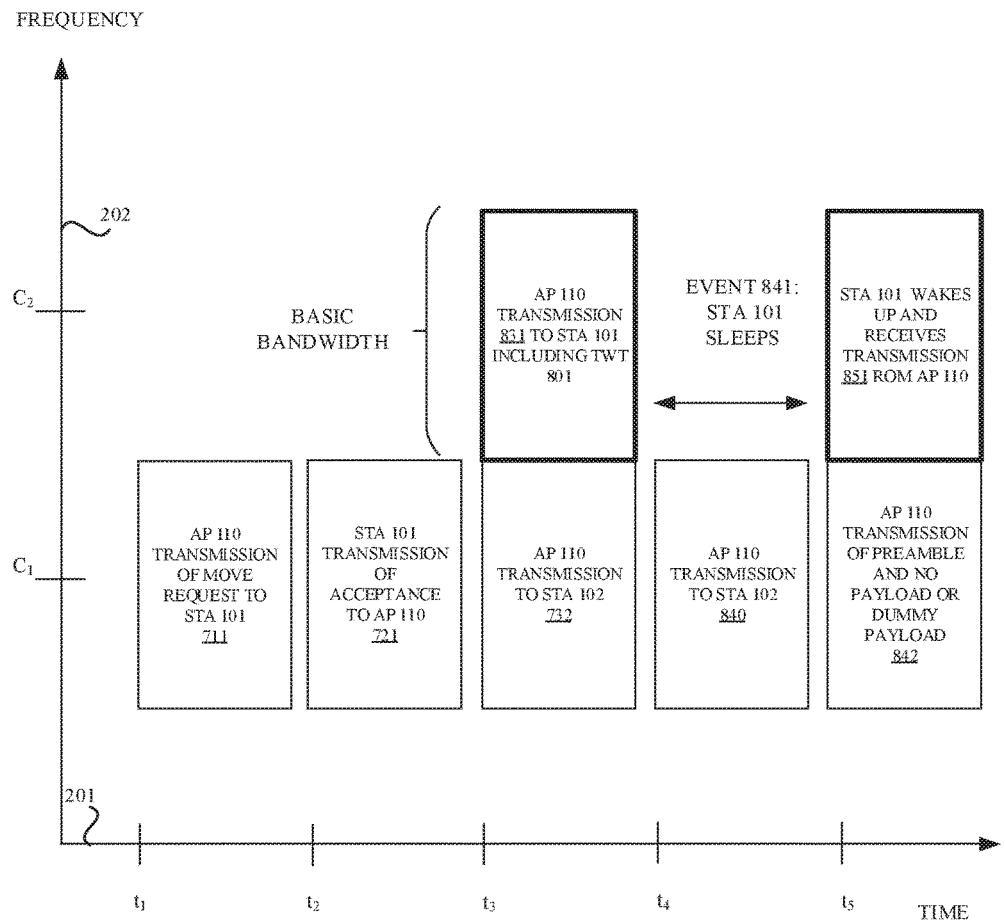
FIG. 8 illustrates exemplary DL transmission events including a basic bandwidth STA moving from a primary channel to a secondary channel and being provided with a target wake time (TWT), according to some embodiments.

FIG. 8 provides an exemplary embodiment commencing with the messages 711 and 721 in which the AP 110 requests, and the STA 101 accepts, retuning to the secondary channel $C_2$, indicated by AP 110. This sequence at times $t_1$ and $t_2$ is the same as in FIG. 7. At $t_3$, the AP 110 sends, in message 831, information TWT 801. Message 831 is part of a single wideband or high bandwidth PPDU that also includes transmission 732 to STA 102 on the primary 20 MHz channel $C_1$. From the information TWT 801, the STA 101 learns that it should sleep until the time $t_5$.

When only STAs on secondary channels have traffic, other STAs sensing the channel on the primary channel may infer that no transmission is taking place. However, transmission may be taking place on the secondary channel. In some embodiments, the AP will send a preamble sequence as part of a type MAC frame on the primary channel. After the preamble, the AP, in some embodiments, sends no payload on the primary channel or sends a dummy payload or packet. The preamble can be transmitted in conjunction with the transmission on the secondary channel.

At time $t_4$, an event 841 is indicated in FIG. 8 corresponding to the STA 101 sleeping, for example not operating radio frequency circuits, during the time interval $t_4$ to $t_5$. At this time ($t_4$ to $t_5$), event 840 represents an AP 110 transmission to STA 102. In some embodiments, event 840 corresponds to an RU sent over primary channel $C_1$ where the RU includes at least a portion of a preamble followed by at least a portion of a dummy payload. At the time $t_5$, STA 101 wakes up and receives transmission 851 from AP 110.

FIG. 8 illustrates a situation at time $t_5$ in which the AP is not sending data on the primary channel $C_1$. In this scenario, the AP 110 may send a preamble signal portion of a MAC frame; this is included in transmission 842 of FIG. 8. Also, the transmission 842 may include dummy payload data following the preamble.

Signaling Formats

FIGS. 9A, 9B, 9C, 9D, and 9E illustrate exemplary MAC frame formats useful for signaling the change to a secondary channel. By using one or more of these signaling formats, an AP can mix a 20 MHz STA transmission in with another 20 MHz STA transmission in a 40/60/80 MHz PPDU. Thus, channels are utilized more efficiently and flexibly, since all channel bandwidth can be used in all PPDUs. In the MAC frame 901 of FIG. 9A, a preamble field 901 is followed by one or more fields 902, including control values 903. Field(s) 904 can include one or more identifiers 905. Field(s) 906 can include one or more durations 907. Field 908 includes a frame body 909. Field 910 includes an FCS value 911. A MAC header 912 is indicated as a subset of MAC frame 901, encompassing fields 902-908, in FIG. 9A.

As a brief aside, this application frequently refers to 20 MHz channels. These correspond to the basic bandwidth annotation of the figures.

Value 924 of FIG. 9B indicates an operation mode value that can be sent in field 902 as one or more control values 903 of MAC frame 901. The HE variant of the HT control field can include an Operation Mode Indication, which has 3 reserved bits. The 3 reserved bits can indicate any/all of 8 channels covering the entire 160 MHz (80+80 MHz); e.g., $C_1, \ldots, C_8$. In some embodiments, a STA can use either the Receive Operating Mode Indication or the Transmit Operating Mode Indication to request that the AP assign a specific secondary channel. In some embodiments, only after receiving approval or acknowledgement of the STA request, does the STA move to the specific channel requested.

The secondary channel identity may be signaled in any of the embodiments provided herein using an index value or a bit map. For example, for an index value indicating one of eight values, exemplary index values are 000, 001, 010, 011, 100, 101, 110, and 111. Exemplary bit map values indicating one of eight values include 00000001, 00000010, 00000100, 00001000, 00010000, 00100000, 01000000, and 10000000.

Value 925 of FIG. 9C indicates one or more TWT parameters that can be sent in field 902 as one or more control values 903 of MAC frame 901. Since a STA on a secondary channel can only perform multiuser transmission and reception, in contrast to the STA of FIG. 3, the STA does not need to spend any time sensing the WM. The AP can establish a target wake time (TWT) with the STA so that the STA will know when the MU packet or trigger frame will arrive.

The TWT information element (IE) format can include any/all of an element ID, a length, and a control field. The TWT element can also include any/all of the following elements that can be repeated for each TWT parameter set when the broadcast field is 1: a request type, a TWT, a TWT group assignment, a nominal minimum TWT wake duration, a TWT wake interval mantissa, a broadcast TWT ID, a TWT channel and/or NDP paging. A TWT information element includes a field called TWT channel, which allows a STA to temporarily move to a different channel within a TWT SP (service period). The TWT channel, in some embodiments, is defined to allocate 3 bits of the TWT IE to indicate a 20 MHz channel index or bitmap (for example one of the indices for the channels $C_1, \ldots, C_8$).

Value 926 of FIG. 9D indicates one or more Control ID parameters that can be sent in field 902 as one or more control values 903 of MAC frame 901. In some embodiments, a Control ID in an HE control field is defined. In some embodiments, this is an HE variant of the HT control field. The control subfield format can include a control ID of, for example 4 bits, followed by control information with a variable length. For example, in some embodiments, control ID value of 7 in the HE control field indicates the move to a secondary channel. The content of the control field when the control ID is 7, in some embodiments, is a channel index or bitmap indicating a 20 MHz channel to which the AP is requesting the STA to move. In some embodiments, the contents of the control field include an indication of whether this frame is a channel move or response. Also, an indication of whether the frame is an acceptance or a rejection is included in some embodiments. For those frames that include a rejection indication, in some embodiments, a reason code for the rejection is included.

FIG. 9E is a schematic representation of an action frame 951 realization of a MAC frame. In some embodiments, the action frame 951 includes any/all of preamble 901, one or more control values 913, one or more identifiers 915, one or more durations 917, frame body 919, and/or FCS 921. In some embodiments, an information element called 20 MHz-Only Parameter Set and a new action frame called 20 MHz Operating Request/Response Frame contains the IE, that is, the 20 MHz-Only Parameter Set. The IE includes the index or bitmap for the 20 MHz channel that the STA will move to if confirmed or acknowledged by the party receiving the request. For example, when sent from the STA, the AP is the party receiving the request and the IE indicates the channel to which the STA is requesting to switch. When sent from the AP, the IE, in some embodiments, assigns the STA (recipient of the 20 MHz channel assignment) to the indicated 20 MHz channel. In some embodiments, only after the receiving party acknowledges the request or assignment, do the AP and STA start communicating with each other on the 20 MHz channel to which the STA has moved.

In addition to the signaling fields discussed above, in some embodiments, a 20 MHz Capability Bit is asserted in an HE Capability Information Element by a STA in order to indicate support for signaling messages and operation on a secondary channel, as discussed above.

Representative Exemplary Apparatus

Figure 10:
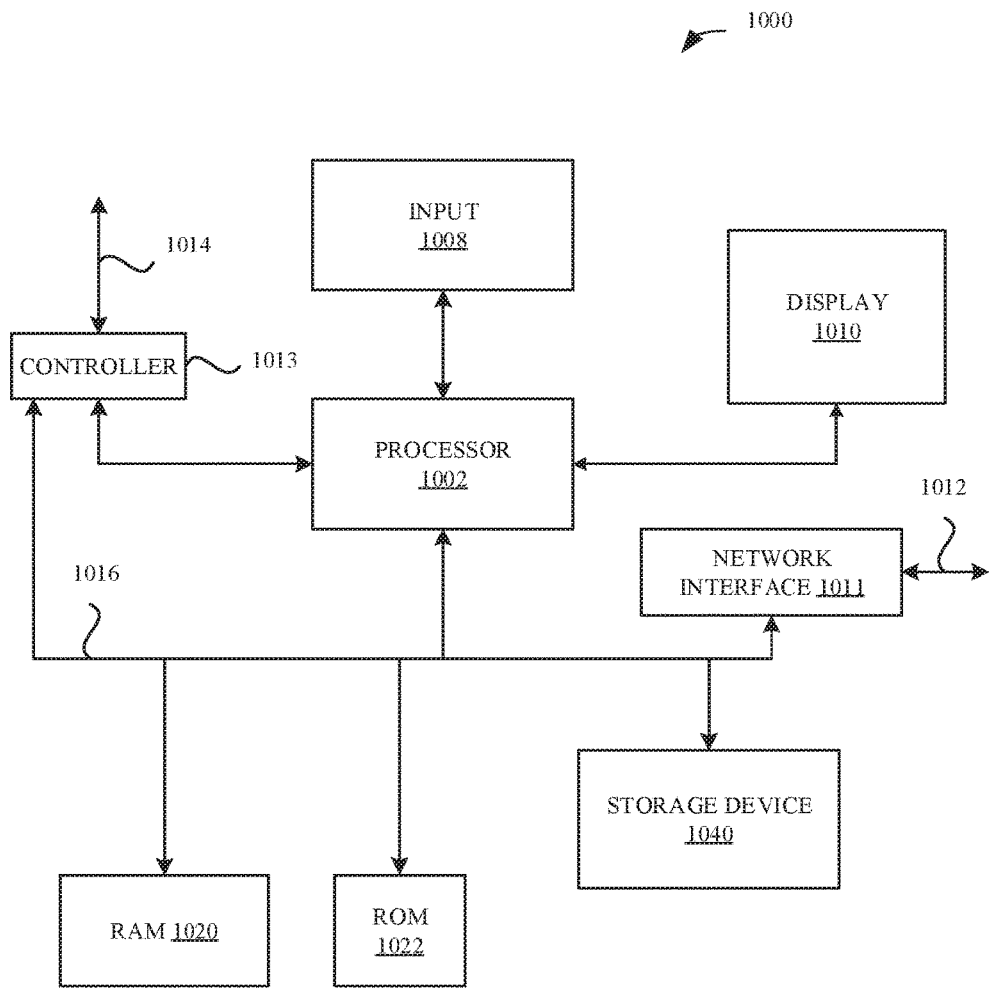
FIG. 10 illustrates an exemplary apparatus for implementation of the embodiments disclosed herein.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in the STA 101, STA 102, STA 103, STA 104, and/or AP 110 illustrated in FIG. 1A and succeeding figures. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with, and control different equipment through, an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can include a single storage or multiple storages (e.g., hard drives, memory modules, etc.), and includes a storage management module that manages one or more logical and/or physical partitions within the storage device 1040. In some embodiments, storage device 1040 can include flash memory, semiconductor (solid state) memory, or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. In some embodiments, the computer readable medium is a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, by a wireless local area network (WLAN) station (STA) of a basic service set (BSS) comprising a WLAN access point (AP), the method comprising:
   at the STA:
   receiving a single physical layer protocol data unit (PPDU); and
   sending, by the STA and responsive to the single PPDU, uplink data on a first plurality of subcarriers present in a secondary frequency band, wherein:
   the PPDU is addressed to the STA and to a second STA,
   the single PPDU occupies a primary frequency band having a first bandwidth and the primary frequency band is associated with a first channel identifier,
   the single PPDU occupies the secondary frequency band having the first bandwidth and the secondary frequency band is associated with a second channel identifier,
   the STA is configured to demodulate only signals characterized by the first bandwidth,
   a first data portion of the PPDU is addressed to the STA, and the first data portion is carried by the first plurality of subcarriers, and
   the single PPDU comprises a trigger frame.

2. The method of claim 1, further comprising:
   prior to receiving the single PPDU:
   sending, from the STA to the AP, a request that the STA begin operating at the secondary frequency band; and
   receiving, at the STA from the AP, an acknowledgement approving the request.

3. The method of claim 1, further comprising:
   prior to receiving the single PPDU:
   receiving, at the STA from the AP, a request that the STA begin operating at the secondary frequency band; and
   sending, from the STA to the AP, an acknowledgement accepting the request.

4. The method of claim 3, wherein the request comprises an indication of the second channel identifier.

5. The method of claim 4, wherein the request comprises: i) an operating mode indication, ii) target wakeup time (TWT) information, iii) an action frame, and/or iv) a control identifier value.

6. A wireless local area network (WLAN) station (STA) comprising:
   a memory; and
   one or more processors, wherein the memory includes instructions, that when executed by the one or more processors, cause the STA to perform operations comprising:
   receiving a single physical layer protocol data unit (PPDU) from a WLAN access point (AP), wherein the STA and the AP are members of a basic service set (BSS); and
   sending to the AP, by the STA and responsive to the single PPDU, uplink data on a first plurality of subcarriers present in a secondary frequency band, wherein:
   the PPDU is addressed to the STA and to a second STA,
   the single PPDU occupies a primary frequency band having a first bandwidth and the primary frequency band is associated with a first channel identifier,
   the single PPDU occupies the secondary frequency band having the first bandwidth and the secondary frequency band is associated with a second channel identifier,
   the STA is configured to demodulate only signals characterized by the first bandwidth,
   a first data portion of the PPDU is addressed to the STA, and the first data portion is carried by the first plurality of subcarriers, and
   the single PPDU comprises a trigger frame.

7. The STA of claim 6, wherein the operations further comprise:
   prior to receiving the single PPDU:
   sending, from the STA to the AP, a request that the STA begin operating at the secondary frequency band; and
   receiving, at the STA from the AP, an acknowledgement approving the request.

8. The STA of claim 6, wherein the operations further comprise:
   prior to receiving the single PPDU:
   receiving, at the STA from the AP, a request that the STA begin operating at the secondary frequency band; and
   sending, from the STA to the AP, an acknowledgement accepting the request.

9. The STA of claim 8, wherein the request comprises an indication of the second channel identifier.

10. The STA of claim 9, wherein the request comprises: i) an operating mode indication, ii) target wakeup time (TWT) information, iii) an action frame, and/or iv) a control identifier value.

11. A method, by a wireless local area network (WLAN) access point (AP) of a basic service set (BSS), the method comprising:

at the AP:

sending a single physical layer protocol data unit (PPDU) to a first WLAN station (STA) and a second STA; and receiving, responsive to the single PPDU, uplink data from the first STA over a first plurality of subcarriers present in a secondary frequency band having a first bandwidth, wherein:

the first and second STAs are members of the BSS, the single PPDU occupies a primary frequency band having the first bandwidth and the primary frequency band is associated with a first channel identifier, the single PPDU occupies the secondary frequency band and the secondary frequency band is associated with a second channel identifier, the first STA is configured to demodulate only signals characterized by the first bandwidth, a first data portion of the PPDU is addressed to the first STA, and the first data portion is carried by the first plurality of subcarriers, and the single PPDU comprises a trigger frame.

12. The method of claim 11, further comprising:

prior to sending the single PPDU:

receiving, from the first STA, a request that the first STA begin operating at the secondary frequency band; and sending, to the first STA, an acknowledgement approving the request.

13. The method of claim 11, wherein the first STA comprises a High Efficiency (HE) STA as defined by the Institute of Electrical and Electronics Engineers (IEEE) or a wireless communications device compliant with a Wi-Fi Alliance (Wi-Fi) certification.

14. The method of claim 11, wherein the first bandwidth is 20 MHz.

15. The method of claim 11, wherein a resource unit (RU) in the single PPDU occupying the primary frequency band includes at least a portion of a preamble followed by at least a portion of a dummy payload.

16. The method of claim 11, further comprising:

prior to sending the single PPDU:

sending, to the first STA, a request that the first STA begin operating at the secondary frequency band;

receiving, from the first STA, a first message comprising an acknowledgement; and receiving, from the first STA, a second message accepting the request.

17. The method of claim 16, wherein the request comprises: i) an operating mode indication, ii) target wakeup time (TWT) information, iii) an action frame, iv) the second channel identifier, and/or v) a control identifier value.

18. The method of claim 11, wherein the first channel identifier corresponds to a first 20 MHz channel of eight 20 MHz channels in a 160 MHz bandwidth.

19. The method of claim 18, wherein the second channel identifier corresponds to a second 20 MHz channel of the eight 20 MHz channels in the 160 MHz bandwidth.

20. The method of claim 19, wherein no other 20 MHz channel is in a frequency between the first and second 20 MHz channels.

\* \* \* \* \*